July 7, 1959  J. M. KALAFSKY  2,893,527
CLUTCH AND THE LIKE

Filed June 12, 1957  2 Sheets-Sheet 1

INVENTOR.
JOSEPH M. KALAFSKY
BY
Oberlin & Limbach
ATTORNEYS.

July 7, 1959 J. M. KALAFSKY 2,893,527
CLUTCH AND THE LIKE
Filed June 12, 1957 2 Sheets-Sheet 2

INVENTOR.
JOSEPH M. KALAFSKY
BY
Oberlin + Limbach
ATTORNEYS.

United States Patent Office 2,893,527
Patented July 7, 1959

2,893,527
CLUTCH AND THE LIKE
Joseph M. Kalafsky, Cleveland, Ohio
Application June 12, 1957, Serial No. 665,182
3 Claims. (Cl. 192—56)

The present invention relates generally as indicated to a clutch device and the like, wherein driving and driven members are engaged and disengaged as desired. The present invention further embodies certain improvements over a part of the mechanism that is disclosed in my Patent No. 2,787,797, granted April 9, 1957.

It is one general object of this invention to provide a device of the character indicated that will quickly disengage or release a driving member from a driven member when a load greater than a predetermined load is applied to the driven member.

It is another object of this invention to provide a device of the character indicated which is effective to disengage a driven member from a driving member when the driven member attains a speed greater than that of the driving member.

It is another object to provide a device to disengage a driven member having circular motion from a driving member having the same circular motion when the driven member has made one revolution.

It is another object to provide a device to disengage a driven member having linear motion from a driving member having the same direction of motion when the driven member reaches a stop or when the driven member becomes overloaded.

It is yet another object of this invention to provide a device of the character indicated in which the force transmitting element between the driving and driven members is in the form of a strut, specifically a toggle linkage, that may be actuated manually or automatically between clutch engaging and disengaging positions without entailing high pressure sliding friction as is characterstic in ratchet, disc, cone, and other mechanical clutches.

Other objects and advantages of the present invention will become apparent as the following description proceeds.

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
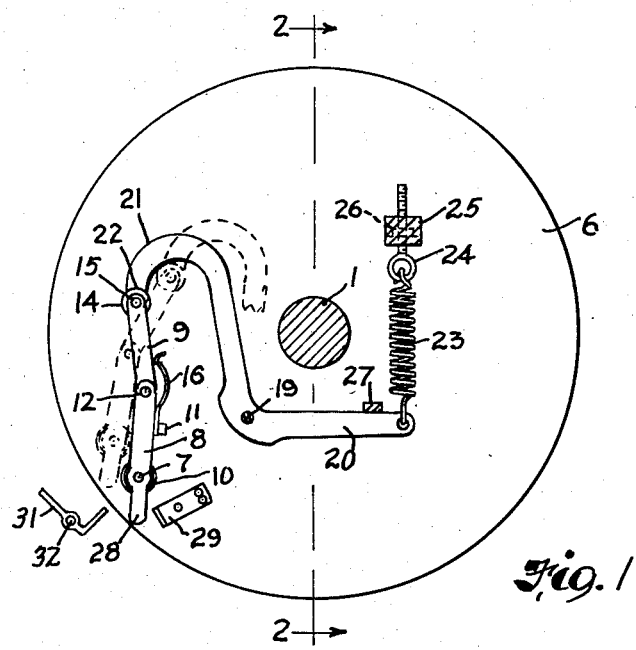
Fig. 1 is a plan view of one embodiment of this invention as viewed along the line 1—1, Fig. 2.
Figure 2:
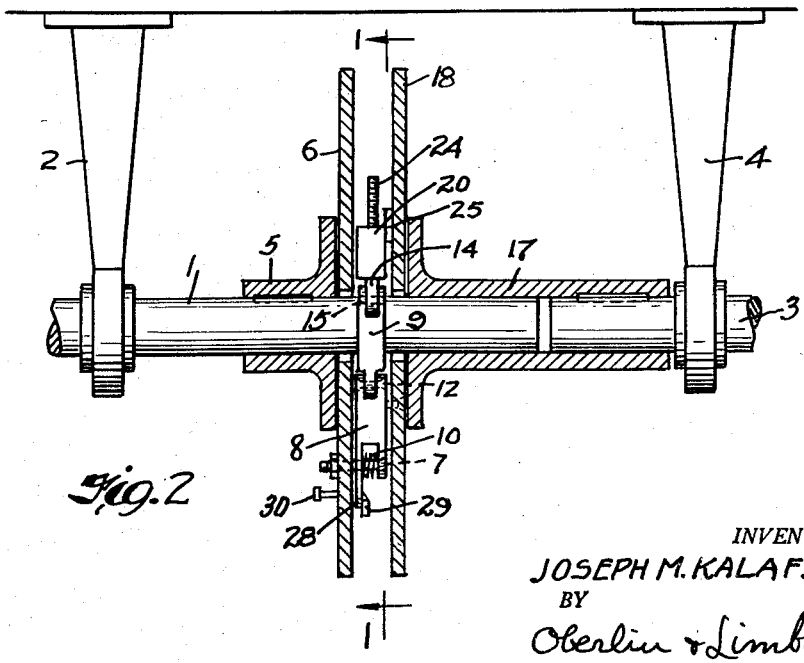
Fig. 2 is a cross-section view taken substantially along the line 2—2, Fig. 1, the clutch elements being shown in elevation.

Referring now in detail to the drawings, and first to Figs. 1 and 2, there is shown therein a drive shaft 1 journalled as in a hanger bracket 2 and a coaxial driven shaft 3 similarly journalled in another hanger bracket 4.

Keyed on shaft 1 is a hub element 5 to which a plate 6 is mounted as by means of screws, by welding or equivalent expedient, said plate 6 mounting a pivot pin 7 on which the link 8 of a toggle linkage 8–9 is pivotally mounted. Around said pin 7 is a torsion spring 10 which is effective to tend to hold the link 8 against the stop lug 11 formed on said plate 6. The other link 9 of said toggle linkage is pivotally connected to said first-named link on the pin 12 and the free end of said link 9 is provided with a roller 14 rotatable on pin 15. A spring 16 on link 8 is effective to normally tend to hold the toggle linkage 8–9 in the locked position as shown in Fig. 1 wherein the knee joint at pin 12 is disposed to one side of a straight line drawn through the pins 7 and 15 at opposite ends of the toggle linkage.

The driven shaft 3 similarly has keyed thereon a hub 17 to which a plate 18 is secured in axially spaced parallel relation to plate 6, said plate 18 pivotally carrying on pin 19 a generally L-shaped arm 20 having a curved end 21 formed with a concavely curved end surface 22 that engages the roller 14 at the free end of the toggle linkage 8–9. The other end of said arm 20 has one end of a tension spring 23 hooked thereto and the other end of said spring 23 is hooked to an eye bolt 24 or the like, which is adjustable in a bracket 25 on said plate by means of the nut 26 which is threaded onto said eye bolt 24. As best shown in Fig. 1, the spring 23 is effective to normally hold the arm 20 in engagement with stop lug 27 on said plate 18.

As evident from the foregoing description, assuming that the drive shaft 1 is rotating in a clockwise direction, as viewed in Fig. 1, the toggle linkage 8–9 constitutes a strut to transmit similar clockwise rotation through plate 18 and hub 17 to the driven shaft 3.

Now, should the torque transmitted to the driven shaft 3 exceed a predetermined value for which spring 23 is adjusted, the arm 20 will swing about the pivot 19 as shown in dotted lines whereby link 9 will be swung inwardly with respect to link 8. When the knee joint 12 of said toggle linkage 8–9 is on the opposite side of dead center (dotted lines in Fig. 1, plate 6 will continue to rotate with respect to plate 18 to collapse the toggle linkage until roller 14 disengages from the end 22 of arm 20. In such collapsed condition of said strut or toggle linkage 8–9, the end 28 of link 7 will be held by spring clip 29 on plate 6 so that even though spring 16 returns the toggle linkage 8–9 to locked condition, the free end of link 9 will then be traveling in an orbit outside the end of arm 20.

When it is desired to re-engage the clutch device, the button 30 on spring clip 29 may be pressed in to release the toggle linkage 8–9 for movement inward about pivot 7 by spring 10 to operating position.

When it is desired to disengage the clutch device other than in response to a predetermined torque as above described there may be provided a release lever 31 pivotally mounted on a fixed pin 32 which, when swung in, will be engaged by the end 28 of link 8 to cause collapse of the toggle linkage 8–9 from its locked to unlocked position.

While in the present case the shafts 1 and 3 are drive and driven shafts, respectively, it is to be understood that the shaft 3 may be the drive shaft and the shaft 1 a driven shaft. In that case, the shafts 3 and 1 would rotate in a counterclockwise direction as viewed in Fig. 1.

Figure 3:
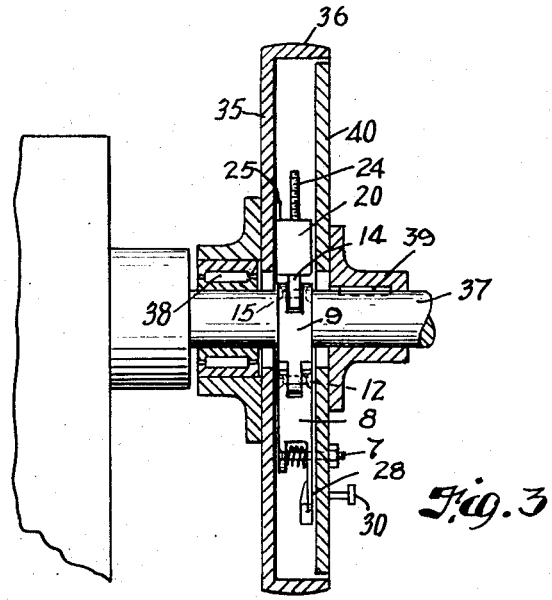
Fig. 3 is a view similar to Fig. 2 except showing the driven member fashioned as a pulley or the like; and, Fig. 4 is a perspective view showing the present clutching device applied to machine elements that have rectilinear movement rather than rotary movement, as shown in Figs. 1 to 3.

The embodiment of the invention shown in Fig. 3 is essentially the same as just described in connection with Figs. 1 and 2, except that the driven element 35 may be in the form of a pulley 36 or the like, which is rotatably mounted on the drive shaft 37 through an anti-friction bearing 38. Thus, there is provided a drive shaft 37 to which is keyed a driving hub 39 having a driving plate 40 secured thereto and, in this case, the arm 20 is shown pivotally mounted on the plate and hub assembly 35 that is journalled on said drive shaft 37; the periphery of said driven plate 35 being formed as a pulley 36 to accommodate a belt or the like. In view of the use of the same or similar parts in the assembly of Fig. 3 as in the assembly of Figs. 1 and 2, there is no need seen to repeat the structure and operation thereof.

Figure 4:
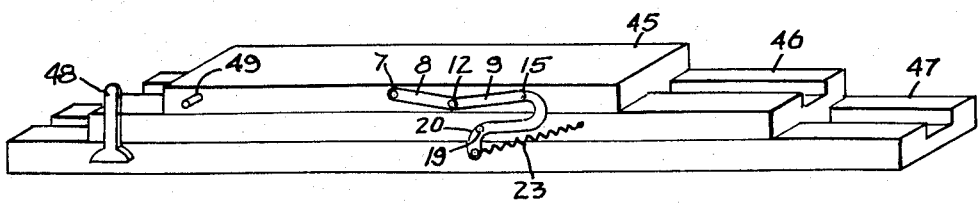

Referring now to Fig. 4, there is shown therein an adaptation of the present invention to a machine tool slide or the like wherein the driving and driven members 45 and 46 have rectilinear movement with respect to each other and to a base part 47. In certain types of machine tools it is desired to have the two parts 45 and 46 move in unison on the base part 47 until a predetermined force is applied, or a predetermined resistance has been encountered, or until the parts have moved to a predetermined position. The toggle linkage 8–9 here is mounted on the part 45 and the arm 20 is pivotally mounted on pin 19 of the other part 46, whereupon when the force transmitted through the toggle linkage exceeds a predetermined value, the arm 20 will swing to thereby collapse or break the toggle linkage in the same way as the toggle linkage is collapsed in Figs. 1 to 3. Thus, when the toggle linkage 8–9 is broken or when the clutch device is released, the parts 45 and 46 may partake of relative rectilinear movement.

The base part 47 may be provided with a stop lug 48 which cooperates with the pin 49 of the top part 45 to provide a fixed stop or starting position.

It is to be noted that in all forms of the invention herein disclosed the driven member is free to overrun the driving member. Moreover, when the arm 20 has once pushed the linkage 8–9 outward, the latter will be retained by spring clip 29 to avoid reengagement of the driven member until desired.

Other modes of applying the principle of the invention may be employed, change being made as regards the details described, provided the features stated in any of the following claims, or the equivalent of such, be employed.

I therefore particularly point out and distinctly claim as my invention:

1. In an automatic overload clutch, the combination of a driving member; a driven member; a toggle linkage comprising a pair of links pivotally connected together to provide a knee joint, one link thereof being pivotally mounted on one member, a yieldable arm on the other member having a portion thereof engaged by the free end of the other link of said toggle linkage, means supporting said arm for yielding, upon predetermined force application through said linkage, in a direction such that the knee joint of said toggle linkage is moved from one side of dead center to the other side, thereby collapsing the toggle and freeing said driving member from said driven member.

2. In a clutch device, the combination of coaxial rotatably mounted driving and driven members, a generally chordwise disposed toggle linkage having one end pivotally mounted on one member about an axis parallel to the axis of said members, a yieldable arm on the other member having a portion thereof in abutting engagement with the other end of said toggle linkage, means supporting said linkage with its knee joint disposed on one side of a line between such pivot and such other end whereby torque may be transmitted from said driving member to said driven member through said toggle linkage, means on said other member supporting said arm for yielding movement in a direction such that the knee joint is shifted to the other side of such line whereby said linkage collapses for movement of the other end thereof out of such abutting engagement with said other member, said linkage, when thus disengaged, permitting relative rotation of said members.

3. In a clutch device, the combination of a driving member, a driven member, means supporting said members for relative movement in a predetermined path, a strut movably supported on one member for movement into and out of force transmitting abutting engagement with said other member whereby said driven member is driven by said driving member and whereby said members are released for relative movement, said strut comprising a toggle linkage including a pair of links pivoted together to form a knee joint, one link being pivotally mounted on said one member, and the other link having its free end movable into and out of abutting engagement with said other member, and yieldable means pivotally mounted on said other member engaged by the free end of said other link, the pivot axis of said yieldable means being located so as to be effective, during pivotal yielding movement, to swing the free end of said other link to break said linkage for movement of such free end to clear said other member.

References Cited in the file of this patent

UNITED STATES PATENTS

| | | |
|---|---|---|
| Re. 23,361 | Hall | Apr. 24, 1951 |
| 715,918 | Wick | Dec. 16, 1902 |
| 1,051,462 | Spellman et al. | Jan. 28, 1913 |
| 1,858,074 | Dameral | May 10, 1932 |
| 1,883,225 | Wood | Oct. 18, 1932 |